US012063316B2

(12) United States Patent
Chao

(10) Patent No.: US 12,063,316 B2
(45) Date of Patent: Aug. 13, 2024

(54) ESTABLISHING A TRUST RELATIONSHIP IN A HYBRID CLOUD MANAGEMENT AND MANAGEMENT SERVICE ENVIRONMENT

(71) Applicant: Dell Products L.P., Round Rock, TX (US)

(72) Inventor: Ching-Yun Chao, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 297 days.

(21) Appl. No.: 17/565,398

(22) Filed: Dec. 29, 2021

(65) Prior Publication Data

US 2023/0208654 A1    Jun. 29, 2023

(51) Int. Cl.
*H04L 29/06*    (2006.01)
*H04L 9/32*    (2006.01)

(52) U.S. Cl.
CPC .......... *H04L 9/3268* (2013.01); *H04L 9/3242* (2013.01); *H04L 9/3247* (2013.01)

(58) Field of Classification Search
CPC ..... H04L 9/3268; H04L 9/3242; H04L 63/20; H04L 63/126; H04L 9/3247; H04L 63/0263
USPC ........................................................ 713/156
See application file for complete search history.

(56) References Cited

U.S. PATENT DOCUMENTS

| | | | |
|---|---|---|---|
| 6,314,521 B1 * | 11/2001 | Debry | H04L 9/3263 726/10 |
| 7,711,951 B2 * | 5/2010 | Chao | G06F 21/602 713/192 |
| 7,849,326 B2 | 12/2010 | Chao | |
| 2003/0190046 A1 * | 10/2003 | Kamerman | H04L 9/3265 713/176 |

* cited by examiner

*Primary Examiner* — Longbit Chai
(74) *Attorney, Agent, or Firm* — Amin, Turocy & Watson, LLP

(57) ABSTRACT

A system can receive, by a cloud management platform, a request from a user account for a trust certificate. The system can provide, to the user account via a first pathway, the trust certificate, comprising a first portion of a secret. The system can provide, to the user account via a second pathway, a second portion of the secret. The system can receive, at an on-premises cloud controller (OPCC), data indicative of the first and second portions. The system can, in response to the OPCC validating the first secret, receive, by the cloud management platform and from the OPCC, a second request to instantiate a trust relationship, wherein the second request comprises a first message body that is signed and encrypted with the first secret. The system can send, by the cloud management platform and to the OPCC, a message that comprises a second trust certificate and a second secret.

20 Claims, 10 Drawing Sheets

700

(702)

↓

RECEIVING, BY A CLOUD MANAGEMENT PLATFORM OF THE SYSTEM, A FIRST REQUEST FROM A USER ACCOUNT FOR A FIRST TRUST CERTIFICATE, WHEREIN THE CLOUD MANAGEMENT PLATFORM IS CONFIGURED TO PROVIDE A HYBRID CLOUD MANAGEMENT FUNCTIONALITY THAT COMPRISES A SERVICE MANAGEMENT DATACENTER, A CUSTOMER DATACENTER FOR A CUSTOMER, PUBLIC CLOUD RESOURCES FOR THE CUSTOMER, AND A COLOCATION DATACENTER 704

↓

PROVIDING, TO THE USER ACCOUNT BY THE CLOUD MANAGEMENT PLATFORM VIA A FIRST PATHWAY, A FIRST CAPABILITY TO ACCESS THE FIRST TRUST CERTIFICATE, WHEREIN THE FIRST TRUST CERTIFICATE COMPRISES A FIRST PORTION OF A FIRST SECRET 706

↓

PROVIDING, TO THE USER ACCOUNT BY THE CLOUD MANAGEMENT PLATFORM VIA A SECOND PATHWAY, A SECOND CAPABILITY TO ACCESS A SECOND PORTION OF THE FIRST SECRET 708

↓

RECEIVING, AT AN OPCC AT THE CUSTOMER DATACENTER, USER INPUT DATA INDICATIVE OF THE FIRST PORTION OF THE FIRST SECRET AND THE SECOND PORTION OF THE FIRST SECRET 710

↓

IN RESPONSE TO THE OPCC VALIDATING THE FIRST SECRET, RECEIVING, BY THE CLOUD MANAGEMENT PLATFORM AND FROM THE OPCC, A SECOND REQUEST TO INSTANTIATE A TRUST RELATIONSHIP, WHEREIN THE SECOND REQUEST COMPRISES A FIRST MESSAGE BODY THAT IS SIGNED AND ENCRYPTED WITH THE FIRST SECRET 712

↓

SENDING, BY THE CLOUD MANAGEMENT PLATFORM AND TO THE OPCC, A MESSAGE THAT COMPRISES A SECOND TRUST CERTIFICATE AND A SECOND SECRET, AND WHEREIN THE MESSAGE COMPRISES A SECOND MESSAGE BODY THAT IS SIGNED AND ENCRYPTED WITH THE FIRST SECRET 714

↓

COMMUNICATING, BY THE CLOUD MANAGEMENT PLATFORM, WITH THE OPCC USING THE SECOND TRUST CERTIFICATE AND THE SECOND SECRET TO VALIDATE COMMUNICATIONS 716

ESTABLISHING A TRUST RELATIONSHIP IN A HYBRID CLOUD MANAGEMENT AND MANAGEMENT SERVICE ENVIRONMENT

BACKGROUND

A hybrid cloud can be a computer system architecture in which a user's data is stored in multiple locations. For example, a user's data can be stored on a user's premises, a user's cloud datacenter, and a colocation datacenter that stores data for multiple users.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, by a cloud management platform of the system, a first request from a user account for a first trust certificate, wherein the cloud management platform is configured to provide a hybrid cloud management functionality that comprises a service management datacenter, a customer datacenter for a customer, public cloud resources of the customer, and a colocation datacenter. The system can provide, to the user account by the cloud management platform via a first pathway, a first capability to access the first trust certificate, wherein the first trust certificate comprises a first portion of a first secret. The system can provide, to the user account by the cloud management platform via a second pathway, a second capability to access a second portion of the first secret. The system can receive, at an on-premises cloud controller (OPCC) at the customer datacenter, user input data indicative of the first portion of the first secret and the second portion of the first secret. The system can, in response to the OPCC validating the first secret, receive, by the cloud management platform and from the OPCC, a second request to instantiate a trust relationship, wherein the second request comprises a first message body that is signed and encrypted with the first secret. The system can send, by the cloud management platform and to the OPCC, a message that comprises a second trust certificate and a second secret, and wherein the message comprises a second message body that is signed and encrypted with the first secret.

An example method can comprise receiving, by a system comprising a processor, a first request from a user account for a first trust certificate. The method can further comprise providing, by the system via a first pathway, the first trust certificate to the user account, wherein the first trust certificate comprises a first portion of a first secret. The method can further comprise providing, by the system via a second pathway, a second portion of the first secret to the user account. The method can further comprise receiving, at an OPCC of the system, user input data indicative of the first portion of the first secret and the second portion of the first secret. The method can further comprise, in response to the OPCC validating the first trust certificate, and using the user input data indicative of the first portion of the first secret and the second portion of the first secret to sign and to encrypt a message body of a second request, receiving, by the system and from the OPCC, the second request to instantiate a trust relationship, wherein the second request comprises the message body that is signed and encrypted with the first secret. The method can further comprise sending, by the system and to the OPCC, a second trust certificate and a second secret. The method can further comprise communicating, by the system, with the OPCC using the second trust certificate and the second secret to validate communications according to the trust relationship.

An example non-transitory computer-readable medium can comprise instructions that, in response to execution, cause a system comprising a processor to perform operations. These operations can comprise receiving, by a first computing device, a first request from a user account for a first trust certificate. These operations can further comprise enabling, by the first computing device, access to the first trust certificate for the user account in multiple parts via respective different pathways, wherein the first trust certificate comprises a first secret. These operations can further comprise in response to a second computing device having validated user input data, received at the second computing device and indicative of a first part of the multiple parts and a second part of the multiple parts, receiving, by the first computing device and from the second computing device, a second request to instantiate a trust relationship, wherein the second request comprises a message body that is signed and encrypted with the first secret. These operations can further comprise sending, by the first computing device and to the second computing device, a second trust certificate and a second secret. These operations can further comprise communicating, by the first computing device, with the second computing device using the second trust certificate and the second secret to secure communications.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow that can facilitate establishing a trust relationship in a hybrid cloud management and management service environment, in accordance with an embodiment of this disclosure;

DETAILED DESCRIPTION

Overview

Figure 1:
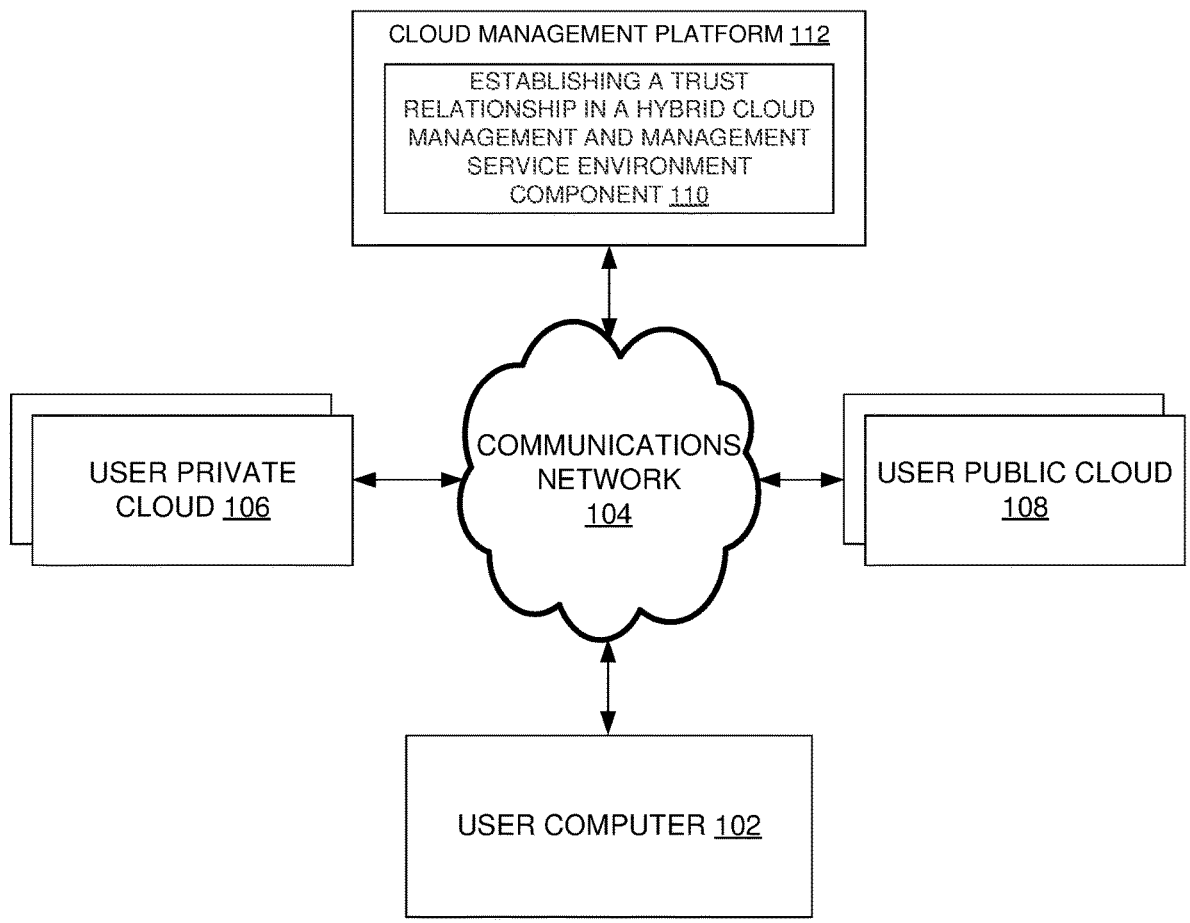
FIG. 1 illustrates an example system architecture that can facilitate establishing a trust relationship in a hybrid cloud management and management service environment, in accordance with an embodiment of this disclosure.

Some approaches to cybersecurity protection can be built on a concept of network perimeter defense. In network perimeter defense approaches, network connections and devices, such as firewalls, can serve as a first line of defense. Then, enterprise resources, such as applications and data, can be protected by layered defenses, such as intrusion detection, authentication, access control, etc. Perimeter protection and defense mechanisms can be based on an assumption that security threats originate from outside of an enterprise perimeter. While that assumption might not have been valid before, it can be less valid as enterprises embrace a hybrid cloud computing environment.

In some examples, the present techniques can be implemented with a seven-step trust establishing protocol. A system that implements the present techniques can continuously monitor and validate integrity and trust policy compliance. Trust validation policy rules and configurable policy rule parameters can be as follows:

Users' trust certificate (sometimes referred to as a subject certificate, or a subject cert) requests can be allowed against active subscriptions.

Users' trust certificate requests can be allowed against customers' pods with OPCC(s) pending setup.

Users' trust certificate requests against customers' pods and OPCCs can be allowed where there is no outstanding customer certificate on the same pod and OPCC(s).

A trust certificate active period can be enforced to be less than N days.

An OPCC certificate active period can be enforced to be less than M years or N months.

A trust certificate and secret can be enforced to be used less than N times.

An OPCC's setup trust request, (e.g., requesting an OPCC certificate and secret), can be blocked where customer secret validation fails N consecutive times within M minutes, checking no tampering by verifying a hash-based message authentication code (HMAC) signature.

An OPCC's setup trust request (e.g., requesting an OPCC certificate and secret), can be blocked where the trust certificate is not associated with the requesting OPCC.

An OPCC's setup trust request (e.g., requesting an OPCC certificate and secret), can be blocked where the OPCC ID does not match customers' site ID and pod ID.

OPCC messages can be continuous monitored for anomalies (e.g., whether a message HMAC signature is valid).

An OPCC can be blocked where an HMAC signature validation fails N times in M seconds.

In some examples, benefits of a trust establishing protocol according to the present techniques can include:

Assets and devices are not intrinsically trusted. For an on-customer or on-partner premise device (e.g., an OPCC, to connect to a cloud management platform), it can be that mutual trust is first established.

Trust establishment can be mutual, rather than single sided. Both a cloud management platform and an OPCC can validate authenticity of trust establishment materials.

Each step of a trust establishing protocol according to the present techniques can validate two pieces of trust establishing materials that are not kept at the same place. This can mean that an attack of a step must compromise at least two pieces of trust data to break the protocol.

Message can be encrypted at message level, and at transport level even during the trust establishing protocol, before the mutual trust is established.

Prior approaches can fail to meet the strong security protection that is provided by implementing the present techniques. The present techniques can be implemented to increase a security protection of a cloud management platform that spans across multiple public and private clouds that are operated by multiple parties.

Some prior approaches to security can implement a built-in certificate to encrypt messages during a trust establishing protocol. This approach can have a drawback of using a well-known public certificate and public key which is a single point of weakness.

Other prior approaches to security can involve letting an on-prem asset generate a key pair, and sending the public key to a cloud management platform. It can be that that initial message is not encrypted and so is vulnerable to man-in-the-middle attacks.

Moreover, prior approaches can rely on a single piece of trust establishing material to establish a trust relationship. In prior approaches, a trust establishing protocol can be either one way or rely on third-party trust. That is, they do not establish mutual trust. Prior approaches do not utilize two separate pieces of verifiable trust establishing materials in every validation step during a trust establishing protocol. This present techniques can be implemented to use two pieces of trust establishing materials in trust validation steps, and conduct trust validation on both sides.

Example Architectures

FIG. 1 illustrates an example system architecture 100 that can facilitate establishing a trust relationship in a hybrid cloud management and management service environment, in accordance with an embodiment of this disclosure.

System architecture 100 can illustrate an example hybrid cloud management and hybrid cloud management as a service topology. In such topologies, it can be that enterprise resources including computing, networking, storage, applications, and data are not always located behind enterprise perimeter protection. And it can be that enterprise users are not always working behind network perimeter protection, either. Moreover, it can be that enterprise resources are not always managed by the enterprise. As shown in system architecture 100, it can be that there is no clear network perimeter boundary on both a data plane and a control plane.

Given these considerations, it can be that an entire enterprise private cloud can no longer be considered as an implicit trust zone. That is, no resource can be inherently trusted. In such examples, enterprise users and enterprise assets that are located remotely cannot fully trust their local network connections. Users, assets, application workflow and data that move between enterprise and non-enterprise infrastructure can need to have a consistent security policy and posture. Zero Trust cybersecurity paradigms can be implemented that move security defense from static, network-based perimeters to focus on users, assets, and resources.

A design principle of a Zero Trust paradigm can be that there is never internal trust. Rather, in such paradigms, it can be that trust must be earned and continuously validated. A problem can arise from this paradigm relating to establishing a trust relationship. That is, if there is never internal trust, how can trust be earned? The present techniques can be applied to establish trust where there is not a single point of weakness. That is, where at least two weaknesses are required to break a security protection.

System architecture 100 comprises user computer 102, communications network 104, user private cloud 106, user public cloud 108, and cloud management platform 112. In turn cloud management platform 112 comprises establishing a trust relationship in a hybrid cloud management and management service environment component 110.

User computer 102 can comprise a computer used to access resources provided by a hybrid cloud architecture, such as data storage and compute resources. User private cloud 106 (which can be one of multiple user private clouds) can comprise assets (e.g., hardware and/or software) accessible to user computer 102 across a communications network, such as communications network 104. User public cloud 108 (which can be one of multiple user public clouds) can comprise user assets stored on a public cloud that permits multiple users to host assets on the public cloud, and where the user assets are accessible to user computer 102 across communications network 104.

Cloud management platform 112 can be configured to manage a hybrid cloud that comprises user private cloud 106 and user public cloud 108 on behalf of user computer 102. Cloud management platform 112 can perform hybrid cloud management functions, where the platform is configured to manage at least some assets at a user datacenter (which can include hardware as well as software components), user public cloud assets, and platform-operated colocation datacenters (which can generally comprise private cloud platforms). Establishing a trust relationship in a hybrid cloud management and management service environment component 110 can establish a trust relationship with components of a hybrid cloud and cloud management platform 112.

Figure 10:
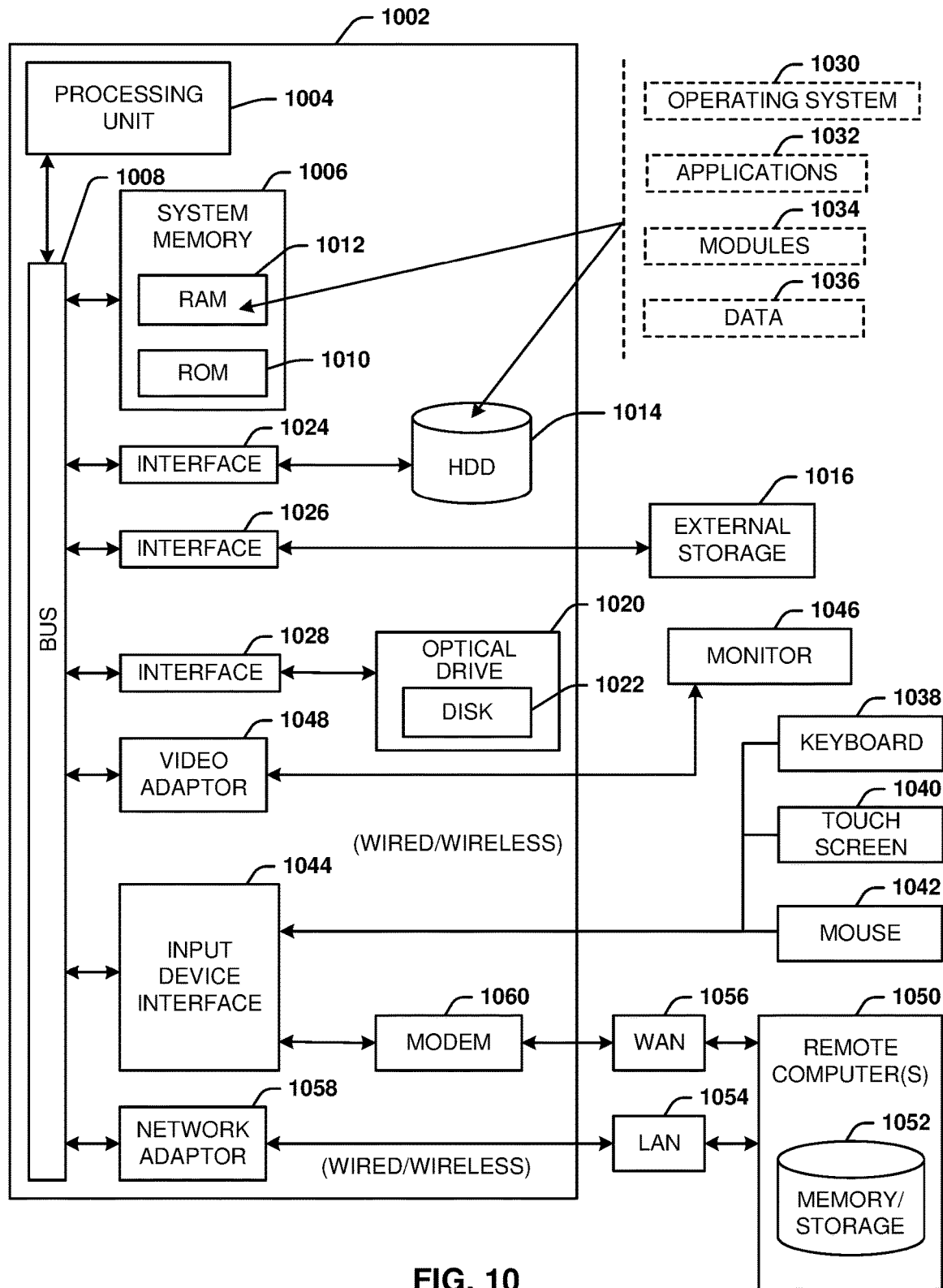
FIG. 10 illustrates an example block diagram of a computer operable to execute an embodiment of this disclosure.

Each of user computer 102, user private cloud 106, user public cloud 108, and/or cloud management platform 112 can be implemented with part(s) of computing environment 1000 of FIG. 10. Communications network 104 can comprise a computer communications network, such as the Internet.

In some examples, establishing a trust relationship in a hybrid cloud management and management service environment component 110 can implement part(s) of the process flows of FIGS. 6-9 to facilitate establishing a trust relationship in a hybrid cloud management and management service environment component 110.

It can be appreciated that this is an example system architecture that logically depicts various components, and that there can be other system architectures used to implement the present techniques.

Figure 2:
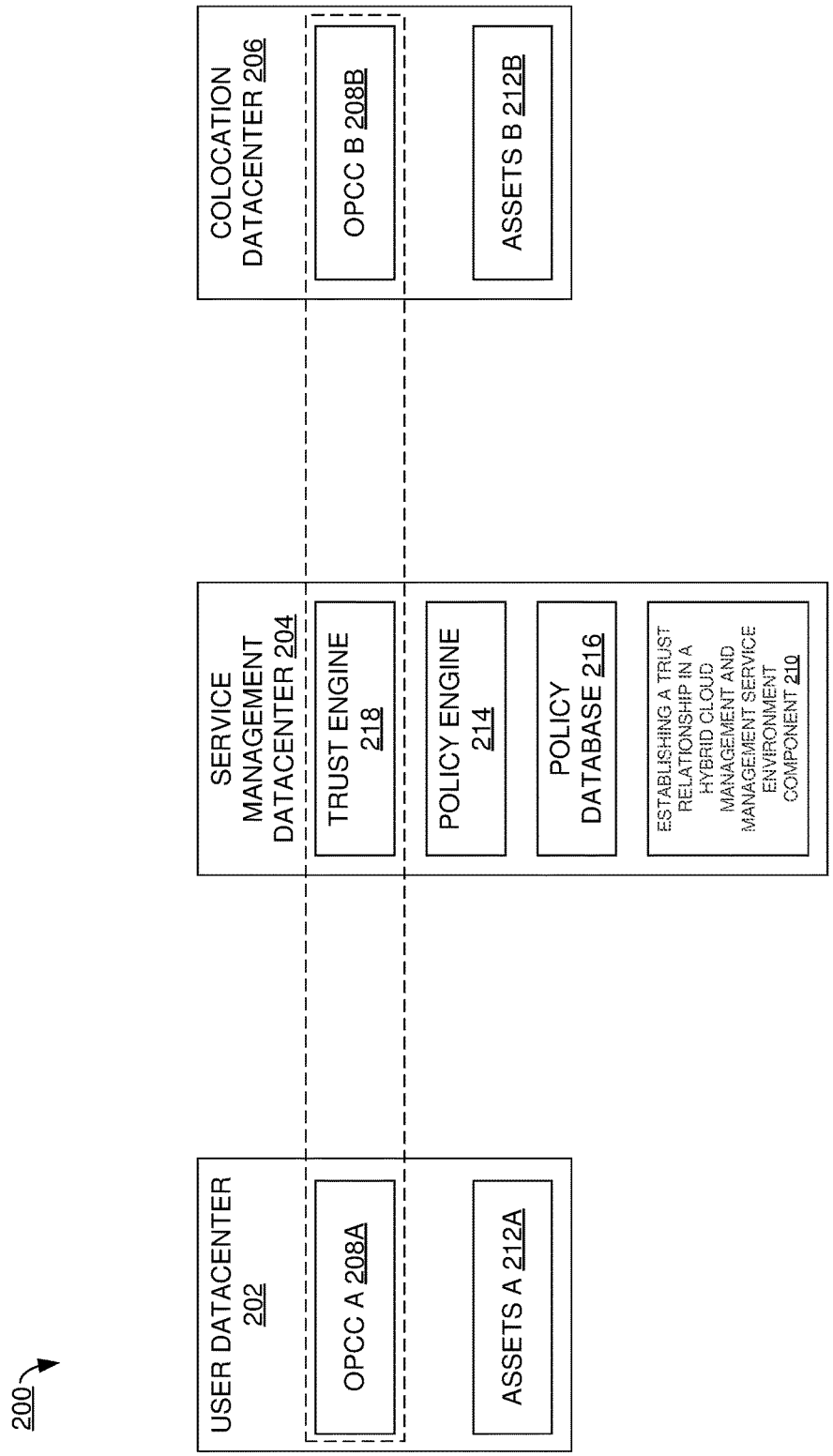
FIG. 2 illustrates another example system architecture that can facilitate establishing a trust relationship in a hybrid cloud management and management service environment, in accordance with an embodiment of this disclosure.

FIG. 2 illustrates another example system architecture 200 that can facilitate establishing a trust relationship in a hybrid cloud management and management service environment, in accordance with an embodiment of this disclosure.

System architecture 200 can illustrate a cloud management platform that manages a hybrid cloud architecture. It can be appreciated that the present techniques can be more generally applied to generally hybrid cloud management and management service topologies and scenarios.

A cloud management platform and an OPCC can first establish a mutual-trust relationship after an OPCC is deployed to a target data center. Then, following a zero-trust security principle, this trust relationship can be continuously validated, including when establishing the trust relationship. An OPCC and a cloud management platform can establish trust by authenticating to each other, where each component can leverage something that only it knows or possesses.

Authenticity and integrity of devices (such as an OPCC) can be protected via techniques such as a trusted platform module (TPM), and attestation. Attestation can generally comprise demonstrating that computer components are properly configured on a computer. Authenticity and integrity of firmware, operating system (OS), middleware, and applications can also be performed.

System architecture 200 comprises user datacenter 202, service management datacenter 204, and colocation datacenter 206. Each of user datacenter 202, service management datacenter 204, and colocation datacenter 206 can be implemented with part(s) of computing environment 1000 of FIG. 10. User datacenter 202 can be similar to user private cloud 106 of FIG. 1, and service management datacenter 204 can be similar to cloud management platform 112 of FIG. 1.

User datacenter 202 comprises OPCC A 208A and assets A 212A. OPCC A can comprise an OPCC that communicates with service management datacenter 204 to establish trust between user datacenter 202 and service management datacenter 204. An OPCC can generally comprise hardware installed at both a user datacenter and platform-operated colocation data centers, which is configured to communicate with a cloud management platform so that the cloud management platform can manage user assets (e.g., move user workloads between user datacenters, public clouds, and colocation sites, or perform software updates on managed hardware in the user datacenter). In some examples, a datacenter can comprise multiple OPCCs, such as in an implementation where one OPCC is installed for each set number of computers in the datacenter that are managed by a cloud management platform.

Assets A 212A can be assets made accessible to user computer 102 as part of a hybrid cloud architecture.

Similarly, colocation datacenter comprises OPCC B 208B (which can be similar to OPCC A 208A) and assets B 212B (which can be similar to assets A 212A).

Service management datacenter 204 comprises policy engine 214, policy database 216, trust engine 218, and establishing a trust relationship in a hybrid cloud management and management service environment component 210. Policy engine 214 can enforce a policy for establishing trust relationships (e.g., a policy that users' trust certificate requests can be allowed against active subscriptions). These policies can be stored in policy database 216.

Trust engine 218 can communicate with OPCC A 208A and OPCC B 208B to establish and maintain a trust relationship. Establishing a trust relationship in a hybrid cloud management and management service environment component 210 can be similar to establishing a trust relationship in a hybrid cloud management and management service environment component 110 of FIG. 1.

Figure 3:
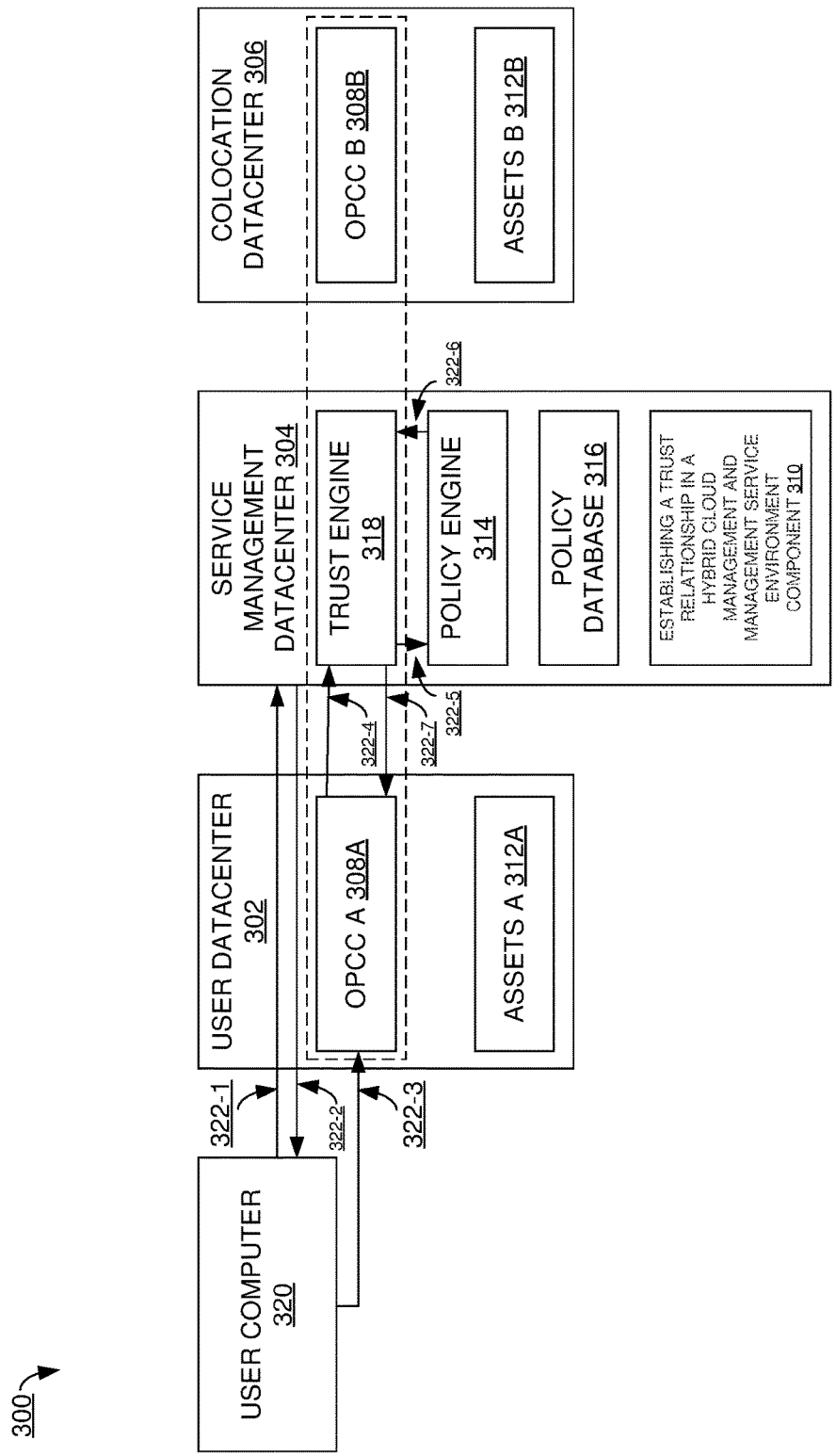
FIG. 3 illustrates another example system architecture that can facilitate establishing trust between a user datacenter and a cloud management platform, as part of establishing a trust relationship in a hybrid cloud management and management service environment, in accordance with an embodiment of this disclosure.

FIG. 3 illustrates an example system architecture 300 that can facilitate establishing trust between a user datacenter and a cloud management platform, as part of establishing a trust relationship in a hybrid cloud management and management service environment, in accordance with an embodiment of this disclosure.

In some examples, system architecture 300 can be similar to system architecture 200, where various communications occur to establish a trust relationship.

System architecture 300 comprises user datacenter 302 (which can be similar to user datacenter 202 of FIG. 2, service management datacenter 304 (which can be similar to service management datacenter 204), and colocation datacenter 306 (which can be similar to colocation datacenter 206).

User datacenter 302 comprises OPCC A 308A and assets A 312A, which can be similar to OPCC A 208A and assets A 212A, respectively. Similarly, colocation datacenter 306 comprises OPCC B 308B and assets B 312B, which can be similar to OPCC B 208B and assets B 212B, respectively.

Service management datacenter 304 comprises policy engine 314, policy database 316, trust engine 318, and establishing a trust relationship in a hybrid cloud management and management service environment component 310, which can be similar to policy engine 214, policy database 216, trust engine 218, and establishing a trust relationship in a hybrid cloud management and management service environment component 210, respectively.

User computer 320 can be similar to user computer 102 of FIG. 1.

Communication 322-1 comprises a user initiating a trust protocol. A user can request a subject cert. A policy engine can validate and authorize a trust engine to issue a trust certificate and a secret to the user. This can comprise validating user credentials and validating user subscriptions. A secret can comprise a shared key—e.g., a single key for both encryption and decryption (in contrast to two keys in public key cryptography).

Communication 322-2 comprises granting the user initial trust. The user can download a trust certificate containing one part (e.g., half) of a secret. The user can receive another part (e.g., half) of the secret via registered email account on record.

Communication 322-3 comprises the user activating a device. The user can submit the trust certificate and the other part of the secret to an OPCC. The OPCC can validate the user's trust certificate authenticity. The OPCC can reconstruct the full secret.

Communication 322-4 comprises the OPCC requesting mutual trust. The OPCC can send a mutual trust request to a cloud computing platform. This request can be encrypted with a secret and signed via HMAC using a hash key derived from the secret. The request body can include OPCC attestation data for validation.

Attestation can be used to validate integrity of configuration data that includes software installed on a device, such as OPCC software. Validation can be performed both by an OPCC and by a cloud management platform. An OPCC can pass attestation data to a cloud management platform, which can compare this received attestation data to a persisted version of attestation data.

Communication 322-5 comprises the trust engine requesting authorization. The trust engine can validate that the user possesses the full secret by decrypting an OPCC request log using the secret. Message integrity (e.g., that the message was not tampered) can be validated by verifying a HMAC signature. OPCC authenticity and integrity can be validated by verifying attestation data.

Communication 322-6 comprises the policy engine granting mutual trust. The trust engine can request that the policy engine authorize the OPCC request. This can involve validating that the user possesses the full secret. This can also comprise validating that the user and the OPCC are related.

Communication 322-7 comprises the trust engine setting up trust. The policy engine can authorize the trust engine to establish trust with the OPCC. The trust engine can issue a new OPCC certificate and secret(s). This communication can be protected by the original secret (of communication 322-2). Once trust is established, the OPCC can discard the original secret. The OPCC can disable the original OPCC certificate and use a new OPCC certificate and new secret(s).

Figure 4:
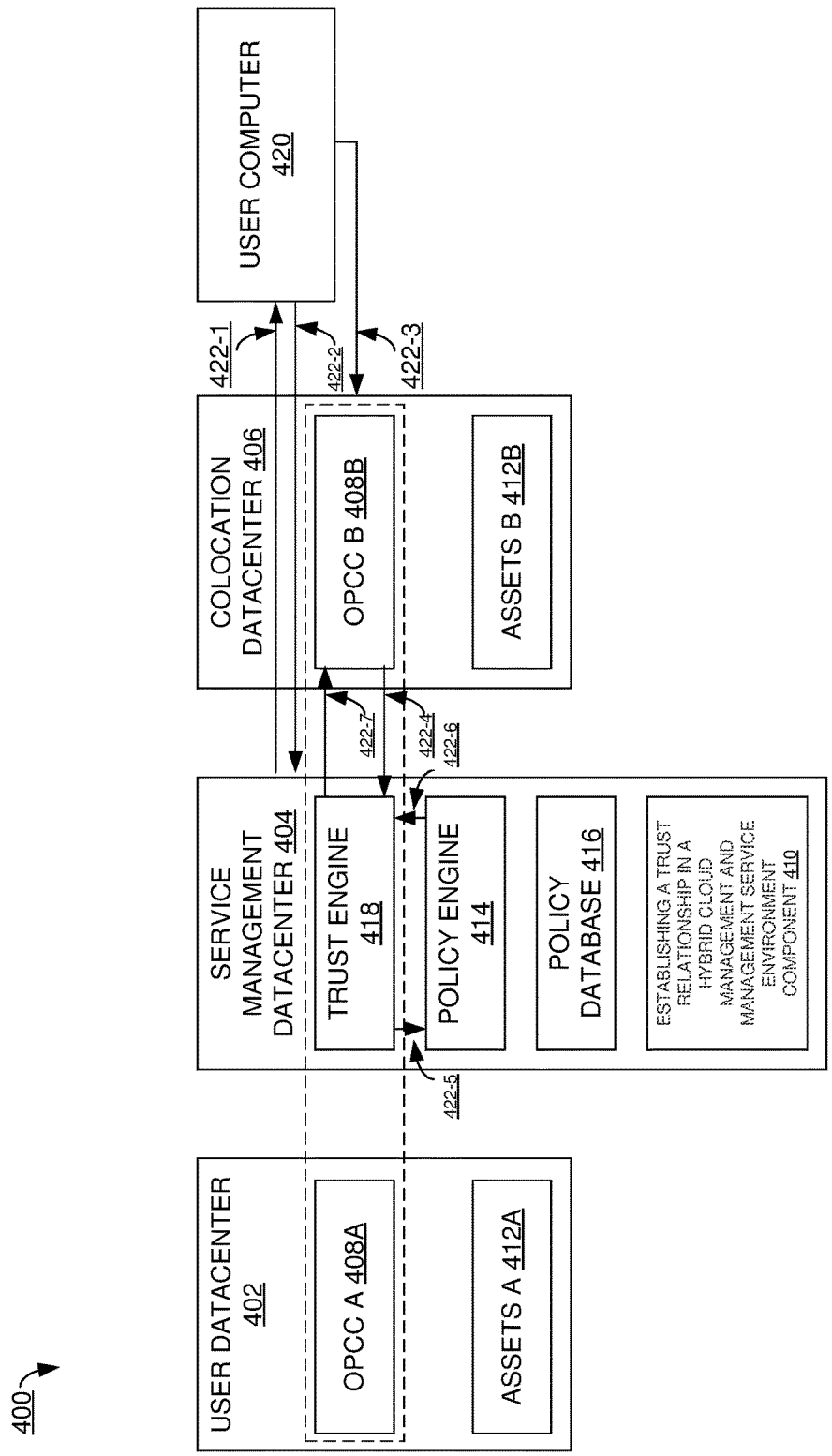
FIG. 4 illustrates another example system architecture that can facilitate establishing trust between a colocation datacenter and a cloud management platform, as part of establishing a trust relationship in a hybrid cloud management and management service environment, in accordance with an embodiment of this disclosure.

FIG. 4 illustrates another example system architecture that can facilitate establishing trust between a colocation datacenter and a cloud management platform, as part of establishing a trust relationship in a hybrid cloud management and management service environment, in accordance with an embodiment of this disclosure. System architecture 400 can be similar to system architecture 300, where trust is established in system architecture 400 between colocation datacenter 406 and service management datacenter 404, while in system architecture 300, trust is established between user datacenter 302 and service management datacenter 304.

System architecture 400 comprises user datacenter 402 (which can be similar to user datacenter 302 of FIG. 3, service management datacenter 404 (which can be similar to service management datacenter 304), and colocation datacenter 406 (which can be similar to colocation datacenter 306).

User datacenter 402 comprises OPCC A 408A and assets A 412A, which can be similar to OPCC A 308A and assets A 312A, respectively. Similarly, colocation datacenter 406 comprises OPCC B 408B and assets B 412B, which can be similar to OPCC B 308B and assets B 312B, respectively.

Service management datacenter 404 comprises policy engine 414, policy database 416, trust engine 418, and establishing a trust relationship in a hybrid cloud management and management service environment component 410, which can be similar to policy engine 314, policy database 316, trust engine 318, and establishing a trust relationship in a hybrid cloud management and management service environment component 310, respectively.

User computer 420 can be similar to user computer 320.

Communication 422-1 comprises a user initiating a trust protocol. A user can request a subject cert. A policy engine can validate and authorize a trust engine to issue a trust certificate and a secret to the user. This can comprise validating user credentials and validating user subscriptions.

Communication 422-2 comprises granting the user initial trust. The user can download a trust certificate containing one part (e.g., half) of a secret. The user can receive another part (e.g., half) of the secret via registered email account on record.

Communication 422-3 comprises the user activating a device. The user can submit the trust certificate and the other part of the secret to an OPCC. The OPCC can validate the user's trust certificate authenticity. The OPCC can reconstruct the full secret.

Communication 422-4 comprises the OPCC requesting mutual trust. The OPCC can send a mutual trust request to a cloud computing platform. This request can be encrypted with a secret and signed via HMAC using a hash key derived from the secret. The request body can include OPCC attestation data for validation.

Communication 422-5 comprises the trust engine requesting authorization. The trust engine can validate that the user possesses the full secret by decrypting an OPCC request log using the secret. Message integrity (e.g., that the message was not tampered) can be validated by verifying a HMAC signature. OPCC authenticity and integrity can be validated by verifying attestation data.

Communication 422-6 comprises the policy engine granting mutual trust. The trust engine can request that the policy engine authorize the OPCC request. This can involve validating that the user possesses the full secret. This can also comprise validating that the user and the OPCC are related.

Communication 422-7 comprises the trust engine setting up trust. The policy engine can authorize the trust engine to establish trust with the OPCC. The trust engine can issue a new OPCC certificate and secret(s). This communication can be protected by the original secret (of communication 422-2). Once trust is established, the OPCC can discard the original secret. The OPCC can disable the original OPCC certificate and use a new OPCC certificate and new secret(s).

Figure 5:
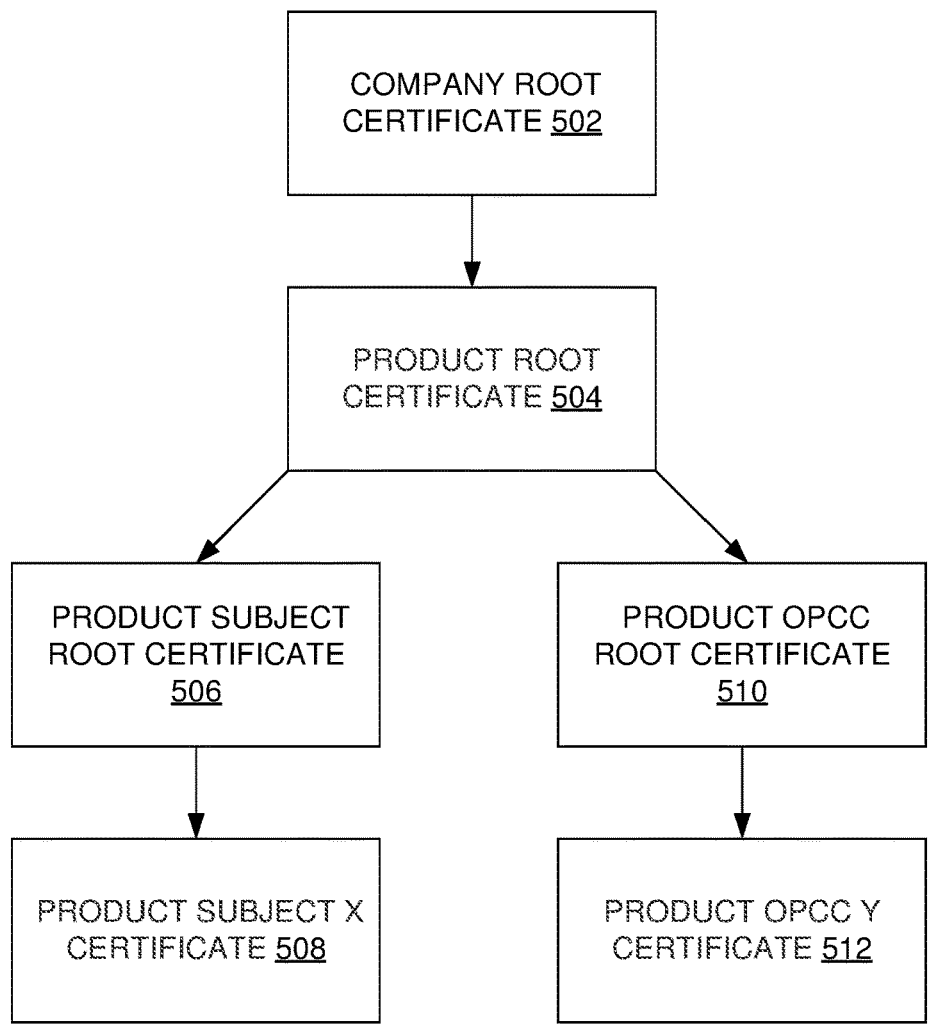
FIG. 5 illustrates an example system architecture for trust certificates that can facilitate establishing a trust relationship in a hybrid cloud management and management service environment, in accordance with an embodiment of this disclosure.

FIG. 5 illustrates an example system architecture for trust certificates that can facilitate establishing a trust relationship in a hybrid cloud management and management service environment, in accordance with an embodiment of this disclosure;

For an OPCC to validate a customer trust certificate, the issuing certificate authority certificate can be pre-installed in the OPCC trust store in at a time of manufacture, and before it is sent to the user. In system architecture 500, customer trust certificates and OPCC certificates can be issued by two different issuing certificate authorities. Separate issuing certificate authorities can increase protection strength and difficult to break. Establishing a trust relationship by validating two or more piece of verifiable data can be implemented. Other parts of a trust establishing protocol according to the present techniques can include validating a user's credentials and user subscription, splitting the secret in two parts, embedding one part in the user's trust certificate, and the other part is sent to the user via a registered email address, the OPCC validates the user trust certificate is issued by the cloud management platform and the user has both parts of secret to use for message encryption, and the cloud management platform validates that the user does have the correct secret and validate that the user and OPCC are indeed associated.

A trust certificate can be associated with a public key in public key cryptography (e.g., where there is a pair of keys—a public key and a private key). A trust certificate can comprise a root certificate and a trust chain of user certificates and device (or asset) certificates.

System architecture 500 comprises company root certificate 502, product root certificate 504, product subject root certificate 506, product subject X certificate 508, product OPCC root certificate 510, and product OPCC Y certificate 512. Each of these certificates can comprise a trust certificate in a hierarchy of trust certificates.

The trust certificates of system architecture 500 can be used by establishing a trust relationship in a hybrid cloud management and management service environment component 110 of FIG. 1 to facilitate Establishing a trust relationship in a hybrid cloud management and management service environment.

Example Process Flows

Figure 6:
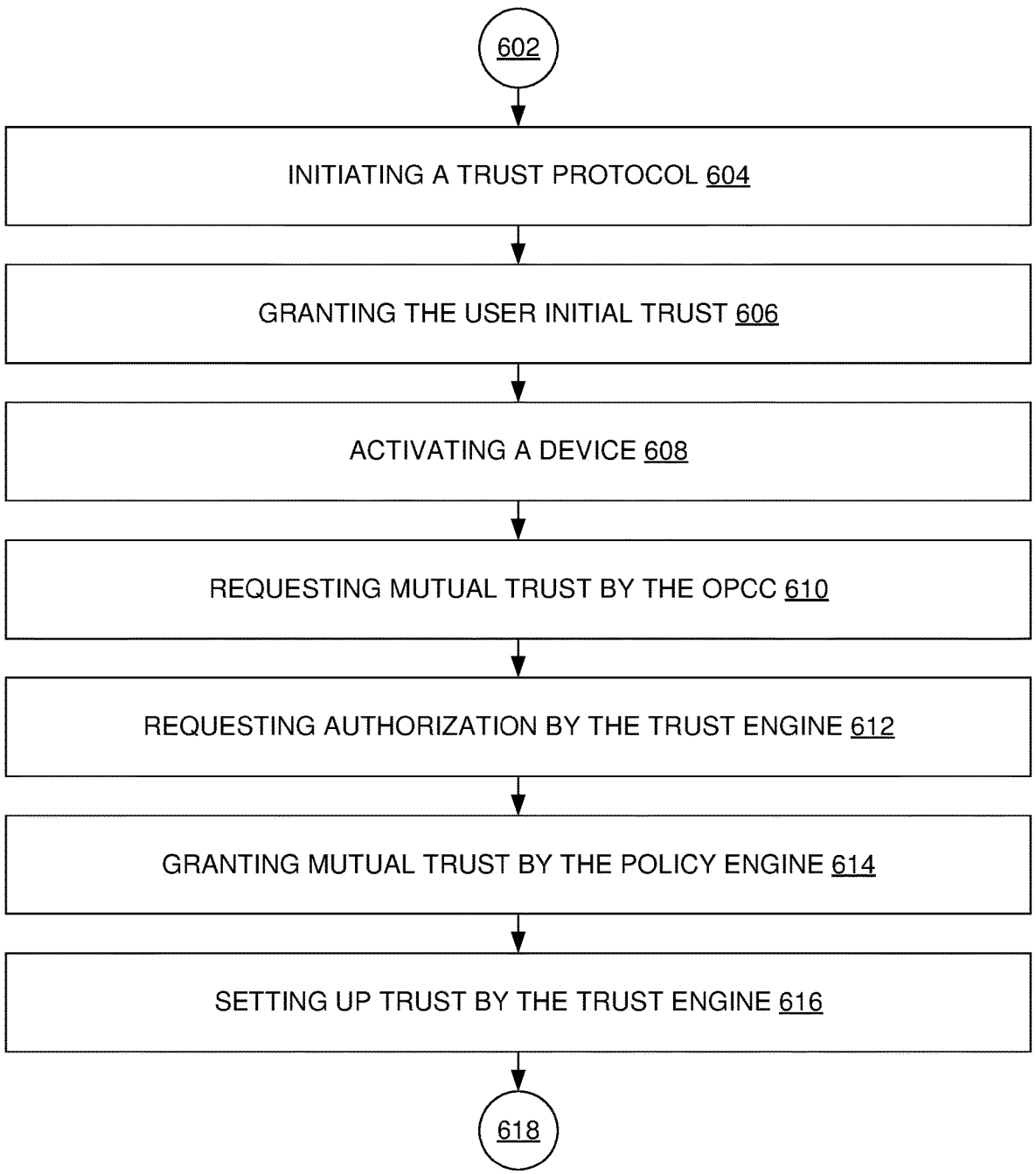
FIG. 6 illustrates an example process flow that can facilitate establishing a trust relationship in a hybrid cloud management and management service environment, in accordance with an embodiment of this disclosure.

FIG. 6 illustrates an example process flow 600 that can facilitate establishing a trust relationship in a hybrid cloud management and management service environment, in accordance with an embodiment of this disclosure. In some examples, one or more embodiments of process flow 600 can be implemented by establishing a trust relationship in a hybrid cloud management and management service environment component 110 of FIG. 1, and/or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, and/or process flow 900 of FIG. 9.

Process flow 600 begins with 602, and moves to operation 604. Operation 604 depicts initiating a trust protocol. In some examples, operation 604 can be implemented in a similar manner as communication 322-1 of FIG. 3.

After operation 604, process flow 600 moves to operation 606.

Operation 606 depicts granting the user initial trust. In some examples, operation 606 can be implemented in a similar manner as communication 322-2 of FIG. 3.

After operation 606, process flow 600 moves to operation 608.

Operation 608 depicts activating a device. In some examples, operation 608 can be implemented in a similar manner as communication 322-3 of FIG. 3.

After operation 608, process flow 600 moves to operation 610.

Operation 610 depicts requesting mutual trust by the OPCC. In some examples, operation 610 can be implemented in a similar manner as communication 322-4 of FIG. 3.

After operation 610, process flow 600 moves to operation 612.

Operation 612 depicts requesting authorization by the trust engine. In some examples, operation 612 can be implemented in a similar manner as communication 322-5 of FIG. 3.

After operation 612, process flow 600 moves to operation 614.

Operation 614 depicts granting mutual trust by the policy engine. In some examples, operation 614 can be implemented in a similar manner as communication 322-6 of FIG. 3.

After operation 614, process flow 600 moves to operation 616.

Operation 616 depicts setting up trust by the trust engine. In some examples, operation 616 can be implemented in a similar manner as communication 322-7 of FIG. 3.

After operation 616, process flow 600 moves to 616, where process flow 600 ends.

FIG. 7 illustrates another example process flow 700 that can facilitate establishing a trust relationship in a hybrid cloud management and management service environment, in accordance with an embodiment of this disclosure. In some examples, one or more embodiments of process flow 700 can be implemented by establishing a trust relationship in a hybrid cloud management and management service environment component 110 of FIG. 1, and/or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, and/or process flow 900 of FIG. 9.

Process flow 700 begins with 702, and moves to operation 704. Operation 704 depicts receiving, by a cloud management platform of the system, a first request from a user account for a first trust certificate, wherein the cloud management platform is configured to provide a hybrid cloud management functionality that comprises a service management datacenter, a customer datacenter for a customer, public cloud resources for the customer, and a colocation datacenter. This can be implemented in a similar manner as communication 322-1 of FIG. 3.

In some examples, operation 704 comprises validating a user credential of the user account and a subscription of the user account before providing the first capability to access the first trust certificate to the user account via the first pathway. That is, a user can provide input of a name and password as credentials, which can be validated, and it can be validated that the user is associated with a subscription for a service provided by a cloud management platform.

After operation 704, process flow 700 moves to operation 706.

Operation 706 depicts providing, to the user account by the cloud management platform via a first pathway, a first capability to access the first trust certificate, wherein the first trust certificate comprises a first portion of a first secret. This can be implemented in a similar manner as communication 322-2 of FIG. 3.

In some examples, the first pathway comprises a download of the first trust certificate from an interface via which the first request is made. In some examples, providing the second capability to access the second portion of the first secret to the user account via the second pathway comprises sending the second portion of the first secret to an email address associated with the user account. That is, different pathways can be used to provide different parts of the secret, such as a download and an email.

After operation 706, process flow 700 moves to operation 708.

Operation 708 depicts providing, to the user account by the cloud management platform via a second pathway, a second capability to access a second portion of the first secret. This can be implemented in a similar manner as communication 322-2 of FIG. 3, as applied to a different part of the secret than in operation 706.

After operation 708, process flow 700 moves to operation 710.

Operation 710 depicts receiving, at an on-premises cloud controller (OPCC) at the customer datacenter, user input data indicative of the first portion of the first secret and the second portion of the first secret. This can be implemented in a similar manner as communication 322-3 of FIG. 3.

After operation 710, process flow 700 moves to operation 712.

Operation 712 depicts, in response to the OPCC validating the first secret, receiving, by the cloud management platform and from the OPCC, a second request to instantiate a trust relationship, wherein the second request comprises a first message body that is signed and encrypted with the first secret. This can be implemented in a similar manner as communication 322-4 of FIG. 3.

In some examples, the second request is signed and encrypted using the first secret by the OPCC.

In some examples, operation 712 comprises using a product subject root certificate in a trust store of the OPCC. That is, the multiple parts of the secret provided by the user can be reassembled to verify that they cumulatively create the full secret.

After operation 712, process flow 700 moves to operation 714.

Operation 714 depicts sending, by the cloud management platform and to the OPCC, a message that comprises a second trust certificate and a second secret, and wherein the message comprises a second message body that is signed and encrypted with the first secret. This can be implemented in a similar manner as communication 322-5, communication 322-6, and communication 322-7 of FIG. 3.

In some examples, operation 714 comprises decrypting the second request using the first secret. That is, a trust engine can validate that the user possesses the full secret by decrypting the OPCC request using the secret.

After operation 714, process flow 700 moves to operation 716.

Operation 716 depicts communicating, by the cloud management platform, with the OPCC using the second trust certificate and the second secret to validate communications. This can comprise using an established trust relationship to conduct communications between an OPCC and a cloud management platform.

After operation 716, process flow 700 moves to 718, where process flow 700 ends.

Figure 8:
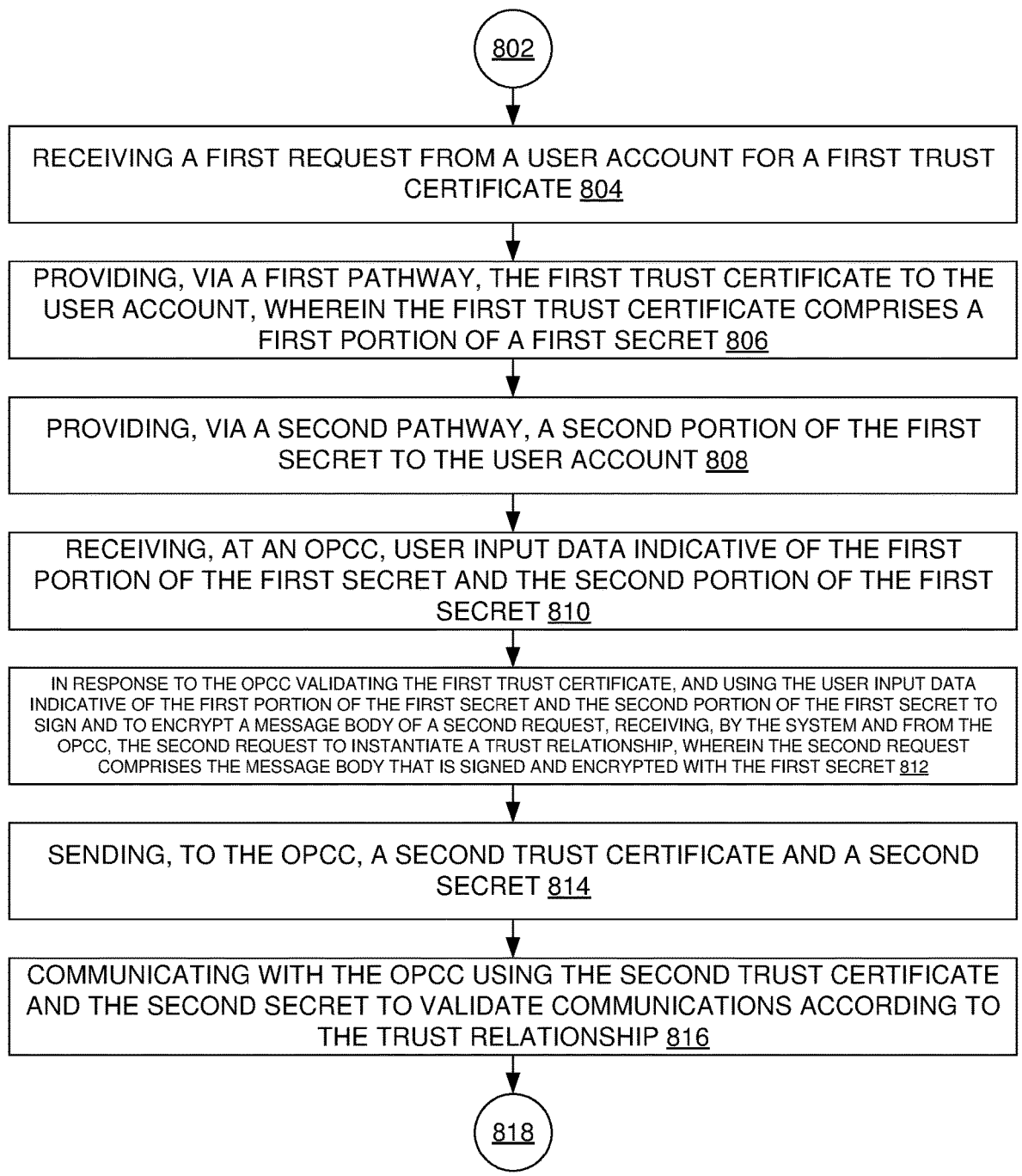
FIG. 8 illustrates another example process flow that can facilitate establishing a trust relationship in a hybrid cloud management and management service environment, in accordance with an embodiment of this disclosure.

FIG. 8 illustrates another example process flow 800 that can facilitate establishing a trust relationship in a hybrid cloud management and management service environment, in accordance with an embodiment of this disclosure. In some examples, one or more embodiments of process flow 800 can be implemented by establishing a trust relationship in a hybrid cloud management and management service environment component 110 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, and/or process flow 900 of FIG. 9.

Process flow 800 begins with 802, and moves to operation 804. Operation 804 depicts receiving a first request from a user account for a first trust certificate. In some examples, operation 804 can be implemented in a similar manner as operation 704 of FIG. 7.

After operation 804, process flow 800 moves to operation 806.

Operation 806 depicts providing, via a first pathway, the first trust certificate to the user account, wherein the first trust certificate comprises a first portion of a first secret. In some examples, operation 806 can be implemented in a similar manner as operation 706 of FIG. 7.

After operation 806, process flow 800 moves to operation 808.

Operation 808 depicts providing, via a second pathway, a second portion of the first secret to the user account. In some examples, operation 808 can be implemented in a similar manner as operation 708 of FIG. 7.

After operation 808, process flow 800 moves to operation 810.

Operation 810 depicts receiving, at an OPCC, user input data indicative of the first portion of the first secret and the second portion of the first secret. In some examples, operation 810 can be implemented in a similar manner as operation 710 of FIG. 7.

After operation 810, process flow 800 moves to operation 812.

Operation 812 depicts, in response to the OPCC validating the first trust certificate, and using user input data indicative of the first portion of the first secret and the second portion of the first secret to sign and to encrypt a message body of a second request, receiving, by the system and from the OPCC, the second request to instantiate a trust relationship, wherein the second request comprises the message body that is signed and encrypted with the first secret. In some examples, operation 812 can be implemented in a similar manner as operation 712 of FIG. 7.

In some examples, the second request is signed with a hash-based message authentication code by the OPCC using a hash key derived from the first secret. This hash key can be a HMAC signature.

In some examples, the second request comprises OPCC attestation data for validation. That is, a body of the second request can contain this OPCC attestation data, and it can be used for validation.

After operation 812, process flow 800 moves to operation 814.

Operation 814 depicts sending, to the OPCC, a second trust certificate and a second secret. In some examples, operation 814 can be implemented in a similar manner as operation 714 of FIG. 7.

In some examples, operation 814 comprises validating an integrity of the second request by verifying a signature of the hash-based message authentication code. That is, it can be validated that the second request has not been tampered with in this manner In some examples, operation 814 comprises validating authenticity and integrity of the OPCC by verifying the OPCC attestation data.

In some examples, operation 814 comprises authorizing, by a policy engine, the OPCC based on a third request by a trust engine. That is, a trust engine can request that a policy engine authorize an OPCC request, and the policy engine can do so.

In some examples, the policy engine validates that the user account provided the first secret as part of the second request, and wherein the policy engine validates that the user account is associated with the OPCC.

After operation 814, process flow 800 moves to operation 816.

Operation 816 depicts communicating with the OPCC using the second trust certificate and the second secret to validate communications according to the trust relationship. In some examples, operation 816 can be implemented in a similar manner as operation 716 of FIG. 7.

After operation 806, process flow 800 moves to 818, where process flow 800 ends.

Figure 9:
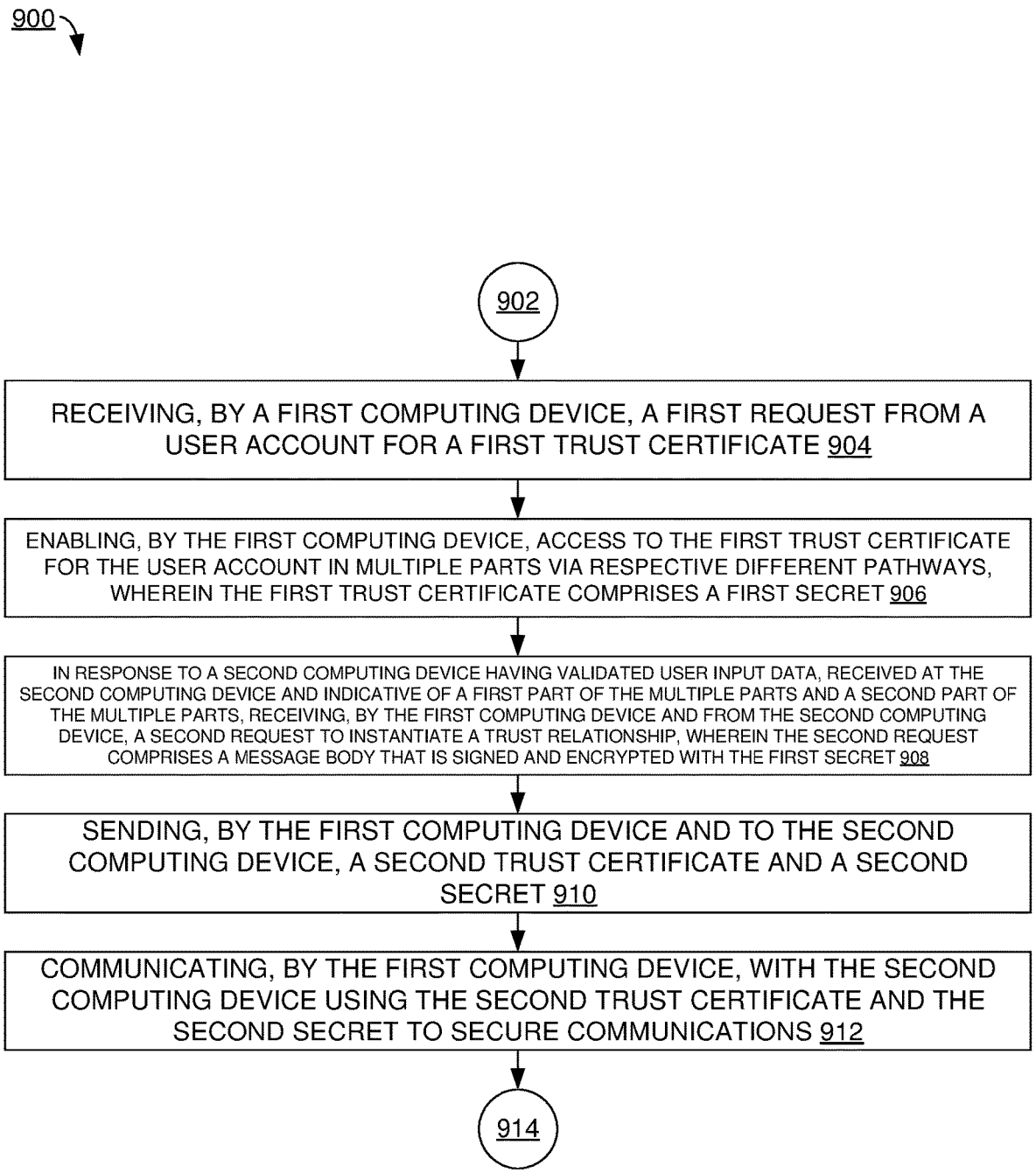
FIG. 9 illustrates another example process flow that can facilitate establishing a trust relationship in a hybrid cloud management and management service environment, in accordance with an embodiment of this disclosure.

FIG. 9 illustrates another example process flow 900 that can facilitate establishing a trust relationship in a hybrid cloud management and management service environment, in accordance with an embodiment of this disclosure. In some examples, one or more embodiments of process flow 900 can be implemented by establishing a trust relationship in a hybrid cloud management and management service environment component 110 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, and/or process flow 800 of FIG. 8.

Process flow 900 begins with 902, and moves to operation 904. Operation 904 depicts receiving, by a first computing device, a first request from a user account for a first trust certificate. In some examples, operation 904 can be implemented in a similar manner as operation 704 of FIG. 7.

After operation 904, process flow 900 moves to operation 906.

Operation 906 depicts enabling, by the first computing device, access to the first trust certificate for the user account in multiple parts via respective different pathways, wherein the first trust certificate comprises a first secret. In some examples, operation 906 can be implemented in a similar manner as operations 706-708 of FIG. 7.

After operation 906, process flow 900 moves to operation 908.

Operation 908 depicts, in response to a second computing device having validated user input data, received at the second computing device and indicative of a first part of the multiple parts and a second part of the multiple parts, receiving, by the first computing device and from the second computing device, a second request to instantiate a trust relationship, wherein the second request comprises a message body that is signed and encrypted with the first secret. In some examples, operation 908 can be implemented in a similar manner as operations 710-712 of FIG. 7.

After operation 908, process flow 900 moves to operation 910.

Operation 910 depicts sending, by the first computing device and to the second computing device, a second trust certificate and a second secret. In some examples, operation 910 can be implemented in a similar manner as operation 714 of FIG. 7.

In some examples, a trust engine of first computing device sends, to the second computing device, the second trust certificate in response to receiving authorization from a policy engine of the first computing device.

In some examples, the trust engine issues the second trust certificate and the second secret.

In some examples, the second trust certificate and the second secret are encrypted with the first secret for any communications sent to the second computing device.

In some examples, the second computing device discards the first secret after communicating with the first computing device using the second trust certificate and the second secret.

In some examples, the second computing device disables the first trust certificate after communicating with the first computing device using the second trust certificate and the second secret.

After operation 910, process flow 900 moves to operation 912.

Operation 912 depicts communicating, by the first computing device, with the second computing device using the second trust certificate and the second secret to secure communications. In some examples, operation 912 can be implemented in a similar manner as operation 716 of FIG. 7.

After operation 912, process flow 900 moves to 914, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of user computer 102, user private cloud 106, user public cloud 108, and/or cloud management platform 112 of FIG. 1; and/or user datacenter 202, service management datacenter 204, and/or colocation datacenter 206 of FIG. 2.

In some examples, computing environment 1000 can implement one or more embodiments of the process flows of FIGS. 6-9 to facilitate establishing a trust relationship in a hybrid cloud management and management service environment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for establishing a trust relationship in a cloud environment, comprising:
   a processor device; and
   a memory that stores executable instructions that, when executed by the processor device, facilitate performance of operations, comprising:
   receiving, by a cloud management platform of the system, a first request from a user account for a first trust certificate, wherein the cloud management platform is configured to provide a hybrid cloud management functionality that comprises a service management datacenter, a customer datacenter for a customer, public cloud resources for the customer, and a colocation datacenter;
   providing, to the user account by the cloud management platform via a first pathway, a first capability to access the first trust certificate, wherein the first trust certificate comprises a first portion of a first secret;
   providing, to the user account by the cloud management platform via a second pathway, a second capability to access a second portion of the first secret;
   receiving, at an on-premises cloud controller (OPCC) at the customer datacenter, user input data indicative of the first portion of the first secret and the second portion of the first secret;
   in response to the OPCC validating the first secret, receiving, by the cloud management platform and from the OPCC, a second request to instantiate a trust relationship, wherein the second request comprises a first message body that is signed and encrypted with the first secret;
   sending, by the cloud management platform and to the OPCC, a message that comprises a second trust certificate and a second secret, and wherein the message comprises a second message body that is signed and encrypted with the first secret; and
   communicating, by the cloud management platform, with the OPCC using the second trust certificate and the second secret to validate communications.

2. The system of claim 1, wherein the operations further comprise:
   validating a user credential of the user account and a subscription of the user account before providing the first capability to access the first trust certificate to the user account via the first pathway.

3. The system of claim 1, wherein the first pathway comprises a download of the first trust certificate from an interface via which the first request is made.

4. The system of claim 1, wherein providing the second capability to access the second portion of the first secret to the user account via the second pathway comprises sending the second portion of the first secret to an email address associated with the user account.

5. The system of claim 1, wherein the OPCC validating the first trust certificate comprises using a product subject root certificate in a trust store of the OPCC.

6. The system of claim 1, wherein the second request is signed and encrypted using the first secret by the OPCC.

7. The system of claim 6, wherein the operations further comprise:
   decrypting the second request using the first secret.

8. A method for establishing a trust relationship in a cloud environment, comprising:
   receiving, by a system comprising a processor, a first request from a user account for a first trust certificate;
   providing, by the system via a first pathway, the first trust certificate to the user account, wherein the first trust certificate comprises a first portion of a first secret;
   providing, by the system via a second pathway, a second portion of the first secret to the user account;
   receiving, at an on-premises cloud controller (OPCC) of the system, user input data indicative of the first portion of the first secret and the second portion of the first secret;
   in response to the OPCC validating the first trust certificate, receiving, by the system and from the OPCC, the second request to instantiate a trust relationship, wherein the second request comprises a message body that is signed and encrypted with the first portion and the second portion of the first secret of the received user input data;
   sending, by the system and to the OPCC, a second trust certificate and a second secret; and
   communicating, by the system, with the OPCC using the second trust certificate and the second secret to validate communications according to the trust relationship.

9. The method of claim 8, wherein the second request is signed with a hash-based message authentication code by the OPCC using a hash key derived from the first secret.

10. The method of claim 9, further comprising:
    validating, by the system, an integrity of the second request by verifying a signature of the hash-based message authentication code.

11. The method of claim 8, wherein the second request comprises OPCC attestation data for validation.

12. The method of claim 11, further comprising:
    validating, by the system, authenticity and integrity of the OPCC by verifying the OPCC attestation data.

13. The method of claim 8, further comprising:
    authorizing, by a policy engine of the system, the OPCC based on a third request by a trust engine of the system.

14. The method of claim 13, wherein the policy engine validates that the user account provided the first secret as part of the second request, and wherein the policy engine validates that the user account is associated with the OPCC.

15. A non-transitory computer-readable medium comprising instructions for establishing a trust relationship in a cloud environment that, in response to execution, cause a system comprising a processor to perform operations, comprising:
    receiving, by a first computing device of the system, a first request from a user account for a first trust certificate;
    enabling, by the first computing device, access to the first trust certificate for the user account in multiple parts via respective different pathways, wherein the first trust certificate comprises a first secret;

receiving, by a second computing device of the system, user input data indicative of the multiple parts of the first secret, to produce received multiple parts of the first secret;

in response to the second computing device having validated the first trust certificate and the user input data, receiving, by the first computing device and sent from the second computing device, a second request to instantiate a trust relationship, wherein the second request comprises a message body that is signed and encrypted with the received multiple parts of the first secret;

sending, by the first computing device and to the second computing device, a second trust certificate and a second secret; and communicating, by the first computing device, with the second computing device using the second trust certificate and the second secret to secure communications.

16. The non-transitory computer-readable medium of claim 15, wherein a trust engine of first computing device sends, to the second computing device, the second trust certificate in response to receiving authorization from a policy engine of the first computing device.

17. The non-transitory computer-readable medium of claim 15, wherein the trust engine issues the second trust certificate and the second secret.

18. The non-transitory computer-readable medium of claim 15, wherein the second trust certificate and the second secret are encrypted with the first secret for any communications sent to the second computing device.

19. The non-transitory computer-readable medium of claim 15, wherein the second computing device discards the first secret after communicating with the first computing device using the second trust certificate and the second secret.

20. The non-transitory computer-readable medium of claim 15, wherein the second computing device disables the first trust certificate after communicating with the first computing device using the second trust certificate and the second secret.

* * * * *